March 28, 1961 M. M. DELGADO 2,977,026
HOT BEVERAGE MIXING AND VENDING MACHINES
Original Filed July 27, 1954 2 Sheets-Sheet 1

INVENTOR.
Manuel M. Delgado
BY Maurice S. Cayne
Atty.

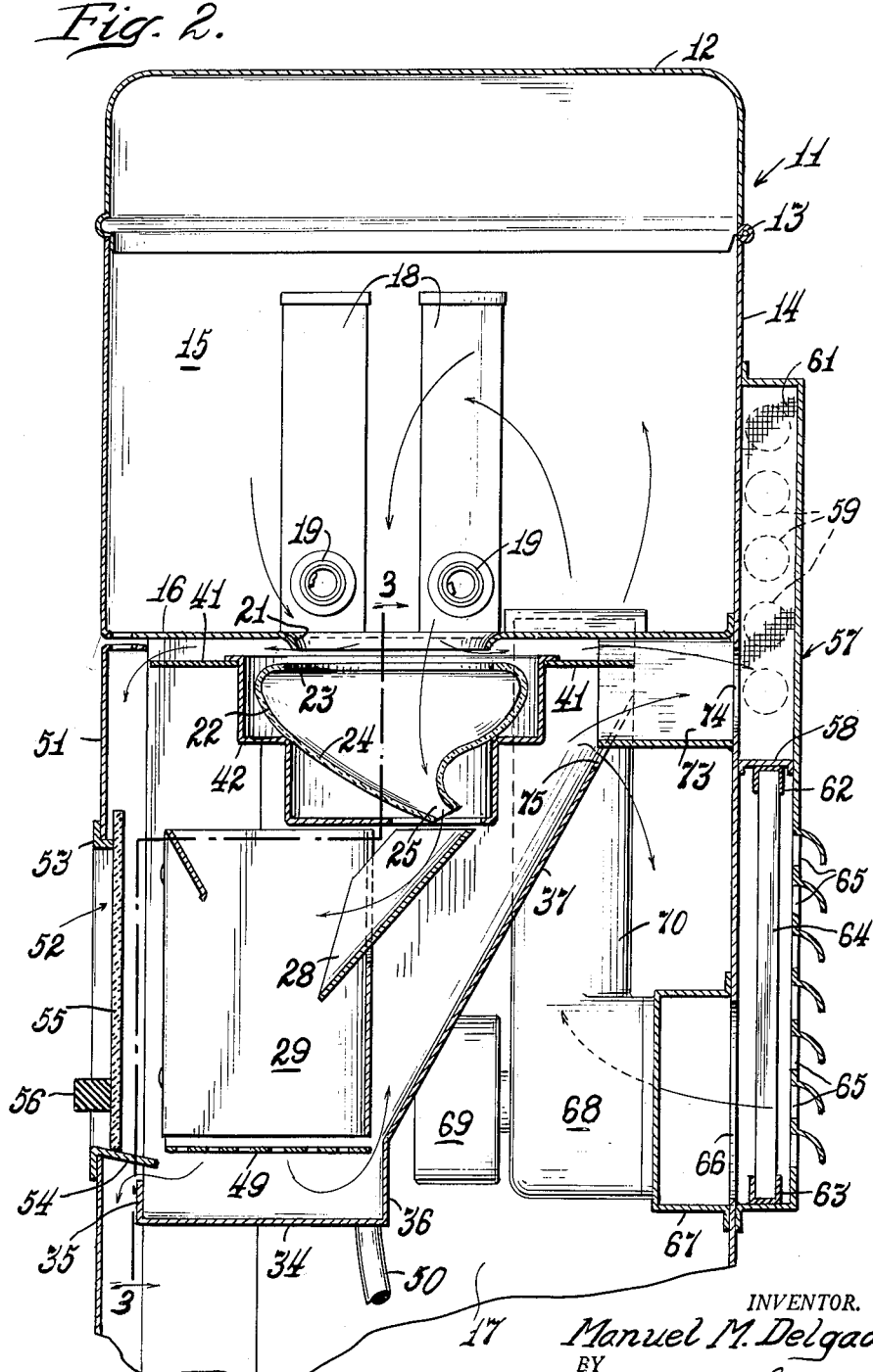

United States Patent Office 2,977,026
Patented Mar. 28, 1961

2,977,026

HOT BEVERAGE MIXING AND VENDING MACHINES

Manuel M. Delgado, Los Angeles, Calif., assignor, by mesne assignments, to The Vendo Company, Kansas City, Mo., a corporation of Missouri Continuation of application Ser. No. 446,049, July 27, 1954. This application Feb. 21, 1957, Ser. No. 642,328

14 Claims. (Cl. 222—129.4)

The invention relates to improvements in machines for mixing and dispensing a hot beverage, such as coffee, with or without cream and/or sugar.

The present invention is particularly concerned with means to prevent coagulation of the coffee, cream and sugar which are stored within the machine housing in dry powder form and are selectively dispensed in measured quantities into a mixing bowl or chamber into which is delivered a measured quantity of hot liquid; in this instance water. The containers for the dry ingredients are located above the mixing bowl with their vending openings or nozzles positioned thereabove. Obviously, when hot liquid is admitted into the mixing bowl, the relative humidity of the air immediately above said bowl and, of course, in the area surrounding the dispensing nozzles, is raised considerably. This high relative humidity tends to cause caking of the dry ingredients on and within the vending nozzles with the result that too much or too little dry ingredients are delivered to the mixing bowl. This adverse situation is overcome by providing the vending machine with novel air circulating means so distributed as to greatly reduce, if not entirely eliminate, the tendency for such caking. Although the provision of a blower or an air circulating device per se is old, the present housing construction and arrangement of its interior is such as to maintain the vending openings in a compartment having an air pressure higher than atmospheric pressure so as to prevent the steam or humid air from entering said compartment, and thereby to prevent steam from flowing around and dampening the nozzles and the dry ingredients to be discharged therefrom.

It is therefore an object of the invention to provide a vending machine of the character described with a novel structure and an arrangement of parts especially adapting it to the circulation of air in a manner that will effectively minimize and in some instances prevent caking of the dry ingredients in and on the vending nozzles.

In the machine illustrated and embodying the present invention, the machine cabinet is divided into an upper compartment and a lower compartment. The dry ingredient containers are located in the upper compartment and their dispensing nozzles are positioned directly above the opening in the partition wall between said compartments. The lower compartment contains the mixing bowl which is positioned beneath the partition opening so as to receive the dry ingredients, and hot liquid is supplied directly to the bowl from a heated container also located in the lower compartment. It is, therefore, an object to provide such a machine with means to maintain the air in the upper compartment at a higher static pressure than the air in the lower compartment so as to prevent the rise of steam from the bowl into the upper compartment.

Another object is to provide novel means to aerate the entire inside of the lower compartment of the vending machine housing.

Another object is to provide means whereby the circulatory air stream entering the lower compartment of the vending machine housing is effective to carry away the heat radiating from the hot water container located therein.

Another object is to provide a vending machine of the character described which includes a novel cabinet divided into two compartments, one of which contains the heated elements and the other of which contains the dry ingredient containers.

Another object is to provide a machine of the character described which is ruggedly constructed, is very easy to service and highly effective in its operation and one which is not too expensive to manufacture.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 2 is a vertical fragmentary sectional view taken substantially on line 2—2 of Fig. 1.

Figure 1:
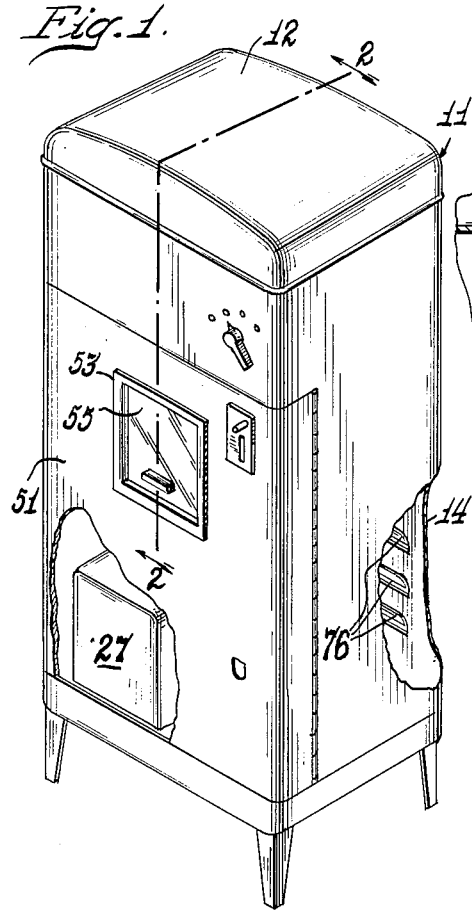
Fig. 1 is a perspective view of the vending machine embodying the features of the present invention, showing portions of the housing broken away.

Vending machines of the kind adapted to mix and vend a hot beverage, such as coffee, are enclosed within a suitable cabinet or housing, generally indicated at 11. For purposes of servicing, the cabinet includes a cover 12 hingedly mounted at 13 to the cabinet back wall 14 so as to be raised into a substantially vertical position whereby access may be had to the interior of an upper compartment 15. The upper compartment 15 has a floor 16, defined by a horizontally disposed partition, which completely divides the cabinet so as to provide the upper compartment 15 and a lower compartment 17. The upper compartment is adapted to contain various control mechanisms (not shown) and dry ingredient containers 18, each having a vending nozzle 19 disposed directly above a flanged opening 21 in the partition 16. It should be sufficient for the purposes of the present disclosure to note that, during a vending operation, dry ingredients are discharged from one or more of the dry ingredient containers 18 through the respective vending nozzles, whereupon said ingredients fall through the opening 21 into a mixing bowl 22 positioned therebelow.

The mixing bowl 22 may be of any suitable configuration but in the present structure it preferably includes an open top surrounded by an inwardly turned flange 23 and converging walls 24 which terminate at their lower ends in a discharge snout 25. The mixing bowl 22 is loosely seated within a frame structure to be described presently and it is adapted to receive, in addition to the dry ingredients, a hot liquid which is discharged thereinto in measured quantities during each vending operation. Upon referring to Fig. 3 it will be observed that the flange 23 of the mixing bowl 22 is deformed for a part of its perimeter so as to provide a side opening for the bowl which receives therein the open end of a liquid conduit 26 connected to a hot water container 27 (Fig. 1) arranged within the lower compartment 17.

The structure insofar as it has been described is such that each time the vending machine is actuated, a measured quantity of hot liquid is discharged into the mixing bowl 22 and at the same time, one or more dry ingredient is discharged thereinto. This mixture is agitated in said bowl by the flow of the liquid and discharged therefrom through the snout 25. Upon leaving the snout 25 of the mixing bowl, the beverage flows into a sharply inclined trough 28 which extends forwardly and downwardly through the back wall of a receptacle chamber generally indicated at 29. The receptacle chamber 29 is suitably supported in and forms a part of an assembly which includes means for supporting the mixing bowl 22 in position. This structure is perhaps best illustrated in Fig. 3.

Figure 3:
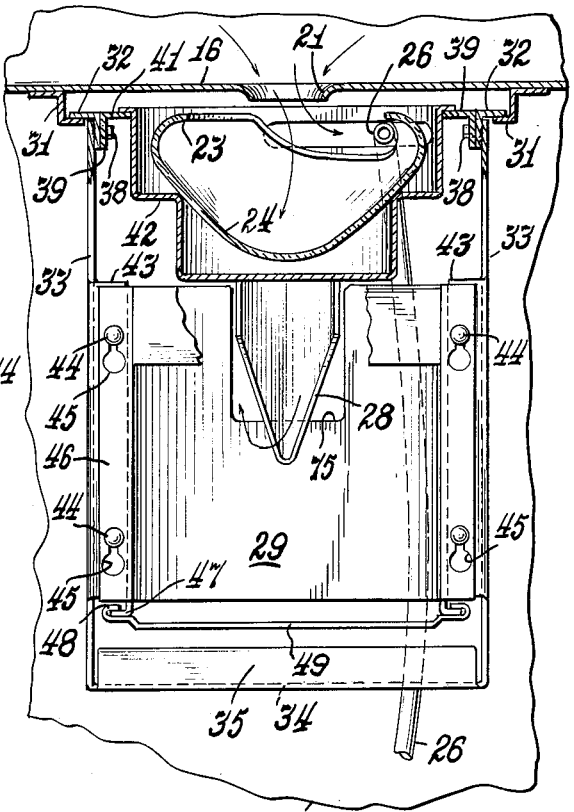
Fig. 3 is a vertical sectional view taken substantially on line 3—3 of Fig. 2.
Figure 4:
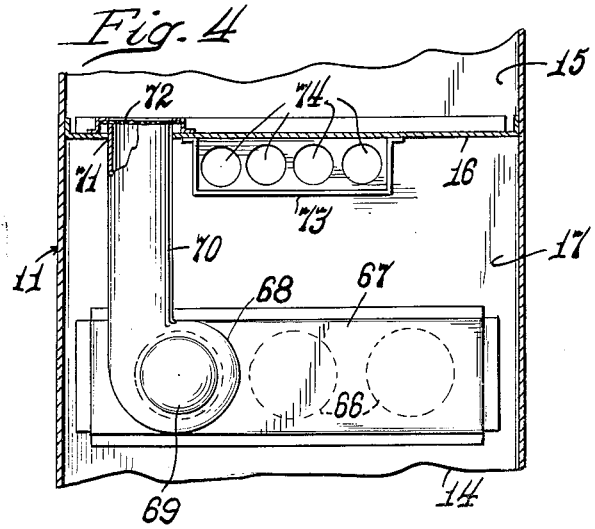
Fig. 4 is a fragmentary vertical sectional view of the housing, taken rearwardly of the structure shown in Fig. 3, illustrating the blower assembly.

Upon referring to Fig. 3, it will be observed a pair of opposed downwardly offset flanges 31 are provided on the bottom face of the partition 16, one on each side of the opening 21. These flanges constitute guides to receive horizontally disposed flanges 32 provided on the upper ends of vertical walls 33 constituting the sides of the frame assembly. The vertical walls 33 constitute integral parts of a bottom wall 34 which has its forward edge turned upwardly to define a flange 35. Referring now to Fig. 2, the bottom wall 34, bridging the side walls 33, terminates at its rear end in a back wall 36 which extends upwardly substantially vertically for a short distance and then is inclined rearwardly upwardly as at 37.

The upper extremities of the side walls 33 have inwardly extending pins 38 adapted to receive freely thereover downwardly turned slotted flanges 39 of a horizontally disposed plate 41, which plate is centrally apertured to receive a stepped cup-like body 42 which constitutes the support for the mixing bowl 22.

The receptacle chamber 29 is removably mounted in the frame structure defined by the vertical walls 33. As is best illustrated in Fig. 3, each vertical wall 33 has an inwardly projecting flange 43 adjacent its front edge provided with a pair of headed pins 44 which engage in bayonet slots 45 in outwardly extending flanges 46 on the forward edges of the receptacle chamber 29. The lower margins of the sides of the receptacle container 29 are outwardly turned to define flanges 47 over which are engaged inwardly turned flanges 48 of a perforated floor plate 49. This floor plate constitutes a support for the container or receptacle for the hot beverage, which receptacle is positioned thereon manually so as to receive the beverage discharged from the trough 28. Any beverage overflow will pass through the perforated floor plate and will drain off through a drain conduit 50.

The cabinet 11 of the vending machine includes, as part of its front wall, a door 51 which has a substantially rectangular opening 52 therein in alignment with the receptacle chamber 29. A frame 53 is fixedly secured in said opening and said frame includes a flange 54 on the bottom of the opening which extends into the cabinet a distance sufficient to overlie the vertical flange 35. A vertically slideable transparent panel 55 is guided in the frame 52 and said panel has on its front face a handle 56 affording means whereby the panel may be raised or lowered to close the cabinet or to permit insertion or removal of a receptacle within the receptacle chamber 29. When the door 51 is open, during servicing of the machine, the entire frame and receptacle chamber 33—29, may be slid out of the housing.

The outside face of the back wall 14 of the cabinet 11 is provided with a substantially rectangular enclosure 57 having a horizontal partition 58 therein. The portion of the enclosure 57, above the partition 58, has a plurality of openings 59 in each of its side walls, which openings are covered on the inside by wire mesh 61. The portion of the enclosure 57, below the partition 58, is provided with upper and lower guides 62—63 respectively, to slideably receive a conventional filter 64 and the back wall of said enclosure is provided with a plurality of louvered openings 65. Relatively large holes 66 are provided in the back wall in communication with the lower portion of the enclosure 57 and said holes normally are covered by a shallow housing 67 which constitutes an elongated horizontal duct having direct communication with a blower 68 mounted thereon. The blower 68 includes a motor 69 which operates at all times and said blower has a duct 70 extending upwardly therefrom and through an opening 71 in the partition 16 so as to draw outside air through filter 64, duct 67, blower 68, duct 70 and into the upper compartment 15. If desired, a wire mesh 72 may be placed over the open upper end of the duct 70 to prevent any foreign matter from being blown into the upper compartment should it pass through the filter 64.

Air blown into the upper compartment 15 circulates freely throughout said compartment. The air escapes from said upper compartment downwardly through the partition opening 21. Air passing out through the opening 21 enters into the bowl 22 and some of said air passes downwardly through the discharge snout 25 into lower compartment 17. Some of said air strikes the top surface of the inturned flange 23 of the bowl and is deflected upwardly so as to travel towards the front and back of the cabinet beneath the partition 16 and above the supporting plate 41. Air passing forwardly moves over the forward end of the plate 41, downwardly, thus comingling with air in the lower compartment 17, whereas some of said air moves rearwardly above the plate 41 and enters a rectangular duct 73 from where it passes through a plurality of ports or holes 74 in the housing back wall 14 into the upper portion of the enclosure 57 and out through the screened side exhaust openings 59. Some of the air circulating through the receptacle chamber and frame 29—33 finds its way into the lower compartment 17 and then out through a gap 75 between the bottom wall of said duct and the upper edge of the inclined receptacle container wall 37 or out through louvered exhaust openings 76 in the housing back wall (Fig. 1). There is also free circulation of air through and around the apertured floor plate 49, through the gap between flanges 35 and 54, and also upwardly as indicated by the arrows on Fig. 2 along the inside surface of the inclined wall 37 towards the duct 73.

It should be quite evident at this time that any tendency of steam to rise from the mixing bowl 22 through the opening 21 in the horizontal partition 16 is prevented by the fact that blower 68 maintains the air within the upper compartment 15 at a pressure higher than atmosphere and higher than the air pressure within the lower compartment 17. Since the steam and humid air from the mixing bowl 22 will not flow from a region of lower pressure to a region of higher pressure, the steam and humid air is prevented from entering the upper compartment 15. This tends to maintain the vending nozzles dry at all times, thus preventing the coagulation of the dry ingredients thereon and therein. The down-draft through the opening 21 also serves to aerate the lower compartment 17 which tends to become heated owing to the presence therein of the hot water container 27. The entire assembly is such that there is no specific path through which the down-draft of air through the opening 21 is directed, said air being free to flow in many directions, all of which ultimately lead to the discharge duct 73 or through the louvered exhaust openings 76 in the housing back wall 14. Because the slide panel 55 has a relatively loose fit, some air may escape the lower compartment around its mounting. It will be understood that the specific arrangement of the exhaust elements such as duct 73, openings 76 and the loose mounting around slide panel 55, have no particular functional significance, since it is merely necessary to provide some means for egress of the air from the lower compartment 17.

It is believed that my invention, its mode of construction and assembly, and many of its advantages, should be readily understood from the foregoing without further description, and it should also be manifest that while a preferred embodiment of the invention has been shown and described for illustrative purposes, the structural details are nevertheless capable of wide variation within the purview of my invention as defined in the appended claims.

This application is a continuation of my copending application Serial No. 446,049, filed July 27, 1954, now abandoned.

What I claim and desire to secure by Letters Patent of the United States is:

1. In a machine for mixing and vending a hot beverage, a housing, a partition dividing said housing into upper and lower compartments, a dry ingredient container located in the upper compartment, means to dispense a measured quantity of dry ingredient from said container terminating above said partition, said partition having an opening beneath said container through which said dispensed ingredient passes, a mixing bowl located in the lower compartment in position to receive the dispensed dry ingredient, said bowl being spaced from said partition, means to deliver a measured quantity of hot liquid to the mixing bowl, and means operable to deliver outside air into the upper compartment to maintain the air in the upper compartment at a higher pressure than the air in the lower compartment.

2. In a machine for mixing and vending a hot beverage of the character recited in claim 1, in which the means operable to deliver air into the upper compartment includes a fan mounted within the lower compartment and connected by a duct with the upper compartment.

3. A cabinet for a beverage mixing and vending machine, a normally closed housing, a partition dividing said housing into upper and lower compartments, an outside air inlet in said housing, a fan connected by a duct with said air inlet, said fan being located in the lower compartment, an exhaust duct for said fan in direct communication with the upper compartment so that air entering said inlet is delivered into said upper compartment, said partition having an opening through which air may flow from the upper compartment into the lower compartment, and the lower compartment having an air exhaust outlet.

4. A cabinet for a beverage mixing and vending machine of the character recited in claim 3, in which the air inlet and air outlet are arranged in the back wall of the housing.

5. A cabinet for a beverage mixing and vending machine of the character recited in claim 3, in which a filter is arranged in the path of air entering said inlet.

6. A cabinet for a beverage mixing and vending machine of the character recited in claim 3, in which a filter is arranged in the path of said air entering said inlet and said filter is mounted in a louvered enclosure on the outside face of the back wall.

7. A cabinet for a beverage mixing and vending machine of the character recited in claim 3, in which the air outlet has a screen thereover to prevent entrance of foreign matter.

8. A cabinet for a beverage mixing and vending machine of the character recited in claim 3, in which the housing includes a slide panel in one wall of the lower compartment that permits some air to escape from the lower compartment.

9. A cabinet for a beverage mixing and vending machine comprising a normally closed housing including a back wall, a partition dividing said housing into upper and lower compartments, a normally closed movable cover forming the top of the upper compartment, the back wall of the lower compartment having an air inlet, a duct on the inside face of said back wall enclosing said inlet, a fan in communication with said duct, a conduit connecting the exhaust side of said fan with the upper compartment so that all air entering said inlet is delivered into the upper compartment, the partition having an opening connecting the two compartments to permit air in the upper compartment to flow downwardly into the lower compartment, an exhaust outlet in the lower compartment communicating with the outside of the housing, means in the lower compartment to cause the air flowing thereinto to follow various paths through the lower compartment interior before some of its is discharged through the exhaust outlet, and additional exhaust outlets in said lower compartment.

10. A cabinet for a beverage mixing and vending machine of the character recited in claim 9, in which the housing has a door constituting a part of the front wall of the lower compartment.

11. A cabinet for a beverage mixing and vending machine comprising a normally closed housing including a back wall, a partition dividing said housing into upper and lower compartments, the back wall of the lower compartment having an air inlet, a duct on the inside face of said back wall enclosing said inlet, a fan in communication with said duct, a conduit connecting the exhaust side of said fan with the upper compartment so that all air entering said inlet is delivered into the upper compartment, the partition having an opening connecting the two compartments to permit air in the upper compartment to flow downwardly into the lower compartment, an exhaust outlet in the lower compartment communicating with the outside of the housing, means in the lower compartment to cause the air flowing thereinto to follow various paths through the lower compartment interior before some of it is discharged through the exhaust outlet, and additional exhaust outlets in said lower compartment.

12. A cabinet for a beverage mixing and vending machine comprising a normally closed housing including a back wall, a partition dividing said housing into upper and lower compartments, a normally closed movable cover forming the top of the upper compartment, the back wall of the lower compartment having an air inlet, a fan in communication with said inlet, a conduit connecting the exhaust side of said fan with the upper compartment so that all air entering said inlet is delivered into the upper compartment, the partition having an opening connecting the two compartments to permit air in the upper compartment to flow downwardly into the lower compartment, an exhaust outlet in the lower compartment communicating with the outside of the housing, means in the lower compartment to cause the air flowing thereinto to follow various paths through the lower compartment interior before some of it is discharged through the exhaust outlet, and additional exhaust outlets in said lower compartment.

13. A cabinet for a beverage mixing and vending machine comprising a normally closed housing including a back wall, a partition dividing said housing into upper and lower compartments, the back wall of the lower compartment having an air inlet, a fan in communication with said inlet, a conduit connecting the exhaust side of said fan with the upper compartment so that all air entering said inlet is delivered into the upper compartment, the partition having an opening connecting the two compartments to permit air in the upper compartment to flow downwardly into the lower compartment, an exhaust outlet in the lower compartment communicating with the outside of the housing, means in the lower compartment to cause the air flowing thereinto to follow various paths through the lower compartment interior before some of it is discharged through the exhaust outlet, and additional exhaust outlets in said lower compartment.

14. A machine for mixing and vending a hot beverage, said machine comprising a housing, a partition wall within said housing, said partition wall having an opening therethrough, a dry ingredient container located within the housing, means for dispensing a measured quantity of dry ingredient from said container, said dispensing means being located adjacent and above said partition wall opening, a mixing chamber located below said partition wall opening, means for delivering a quantity of hot liquid into the mixing chamber, and means for maintaining the region above said partition wall at a higher static pressure than the region below said partition wall so as to substantially prevent steam or vapor from flowing upwardly from the mixing chamber into contact with said dry ingredient dispensing means.

References Cited in the file of this patent

UNITED STATES PATENTS

| | | |
|---|---|---|
| 1,944,810 | Rogers | Jan. 23, 1934 |
| 2,614,738 | Mills | Oct. 21, 1952 |
| 2,626,785 | Lewis | Jan. 27, 1953 |